United States Patent [19]
Porter

[11] Patent Number: 5,226,704
[45] Date of Patent: Jul. 13, 1993

[54] DISPLAY AND STORAGE STAND FOR RECORDING MEDIA

[76] Inventor: Mark A. Porter, 2015 SW. 196th, Aloha, Oreg. 97006

[21] Appl. No.: 782,169

[22] Filed: Oct. 24, 1991

Related U.S. Application Data

[63] Continuation-in-part of Ser. No. 644,287, Jan. 22, 1991, abandoned.

[51] Int. Cl.$^5$ .............................................. A47B 81/06
[52] U.S. Cl. .................................. 312/9.48; 312/129; 312/234.3; 312/321.5
[58] Field of Search ............ 312/118, 119, 120, 321.5, 312/129, 311, 204, 12, 9.48, 234.3; 211/40

[56] References Cited

U.S. PATENT DOCUMENTS

| | | | |
|---|---|---|---|
| 100,995 | 3/1870 | Foster | 312/118 X |
| 117,107 | 7/1871 | Phillips | 312/119 |
| 364,448 | 6/1887 | Steinfield et al. | 312/118 |
| 908,344 | 12/1908 | Simanek | 312/118 X |
| 1,156,644 | 10/1915 | Vetter | 312/119 X |
| 1,594,995 | 8/1926 | Brawner et al. | 312/118 |
| 1,611,742 | 12/1926 | Hammer | 312/118 X |
| 2,014,516 | 9/1935 | Beddingfield | 312/118 |
| 4,453,785 | 6/1984 | Smith | 312/12 X |
| 4,753,343 | 6/1988 | Flynn | 211/40 X |

Primary Examiner—Peter R. Brown
Attorney, Agent, or Firm—Chernoff, Vilhauer, McClung & Stenzel

[57] ABSTRACT

A display and storage stand for recorded media containers includes a case having one or more slotted racks which support a plurality of discrete media containers. The case has an opening through which containers are inserted into and removed from the racks. A slot, which surrounds the periphery of the opening, supports a container so that printed material on the face of the container is visible. In one embodiment a door covers the opening. A window extends through the door, and the slot is located in the door such that the printed material is visible through the window. In another embodiment a window is in the face of the drawer that carries the racks. In a third embodiment a window is in a drawer which carries a portion of the racks.

2 Claims, 5 Drawing Sheets

DISPLAY AND STORAGE STAND FOR RECORDING MEDIA

RELATED APPLICATIONS

This application is a continuation-in-part of application Ser. No. 07/644,287 filed Jan. 22, 1991 now abandoned.

BACKGROUND AND SUMMARY OF THE INVENTION

This invention relates to a storage stand for compact discs and other recorded media, and in particular to such a stand that permits selected media containers to be displayed so that printed material located on their face can be seen.

Stands for storing recorded media are legion. However, most recorded media has colorful printed material on its cover and the prior art stands do not provide a satisfactory way to display this material. Those stands which do provide for the display of printed material do so merely by storing the media containers in a vertical orientation and making the cover of the first container visible. Some of these devices, such as Harvey, U.S. Pat. No. 3,254,927 and Wooster, U.S. Pat. No. 4,290,530, make a particular effort to display the printed material on the cover of the first media container in the stand. Those prior art stands which display the cover of the first media container do not support the media containers discretely, however, but merely place them in a stack. Thus, it is difficult to locate a particular item and remove it from the stand. Conversely, those prior art stands which do support the media containers discretely, do not provide a systematic way to display the covers of selected containers.

The subject invention overcomes the foregoing shortcomings of the prior art by providing a storage stand having a rack that is configured to hold a plurality of media containers, with each set of one or more containers being individually supported. The stand has one or more openings through which containers are inserted into or removed from the rack. Slots located in the stand adjacent to the openings are arranged to receive the media containers and support them such that they cover the openings and their printed material is visible. The slots open out of the device to facilitate insertion and removal of the media containers. Thus, containers are displayed independently of the rack, and, therefore, do not require any specific rack configuration. In addition, the media container being displayed can be changed easily.

In a preferred embodiment, the opening is covered by a door that must be opened to insert or remove containers from the rack. In this embodiment, the door has a window through which the printed material is visible.

The stand can include multiple racks, and generally an opening will be associated with each rack. Additional windows may also be located in the body of the support stand case. One door may have multiple windows and cover multiple racks. In addition, a single slot can service two side-by-side openings or windows.

In one embodiment the racks are divided into pairs with one rack in each pair being located in the door and the other being located in the case. In another embodiment, the racks are in a drawer which slides in and out of the case, and the windows are located in the drawer front.

Accordingly, it is a principal object of the subject invention to provide a display and storage stand for recorded media containers having a rack which discretely supports individual containers, and a separate location for displaying printed material located on the cover of one or more of the containers.

It is a further object to provide such stand in which the cover is displayed.

The foregoing and other objectives, features and advantages of the present invention will be more readily understood upon consideration of the following detailed description of the invention taken in conjunction with the accompanying drawings.

PREFERRED EMBODIMENT OF THE INVENTION

Figure 1:
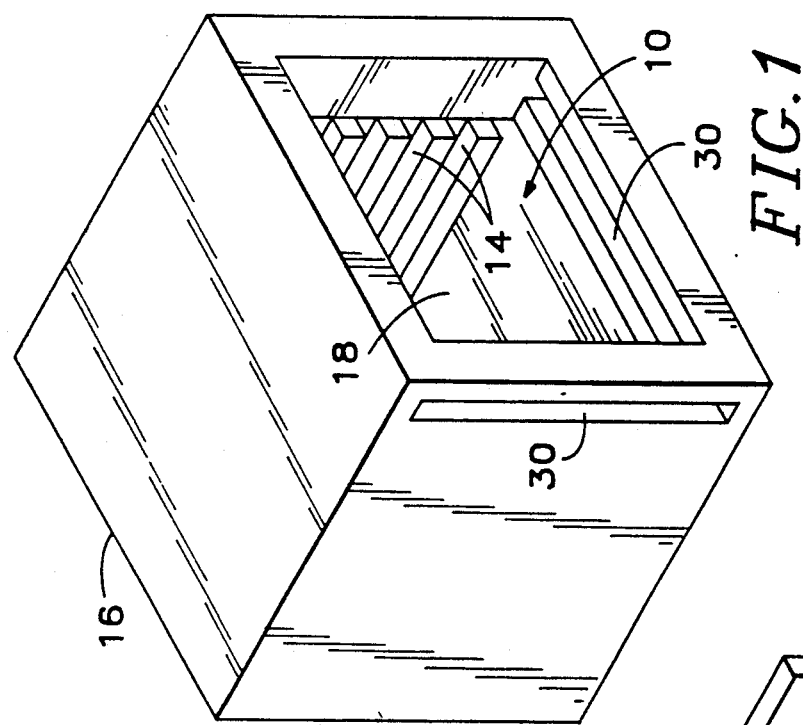
FIG. 1 is a perspective view of a display and storage rack embodying the features of the subject invention.
Figure 2:
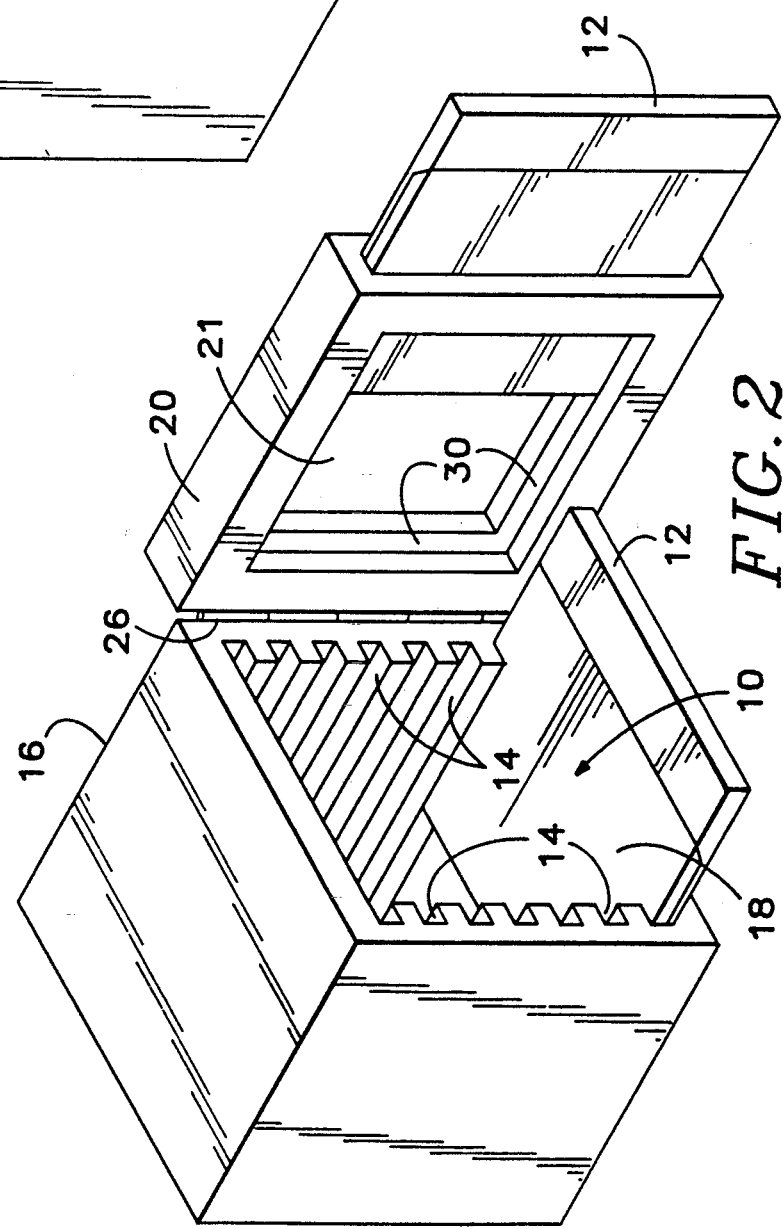
FIG. 2 is a perspective view of a storage and display rack showing another embodiment of the invention.

Referring to the drawings, the display and storage stand of the subject invention comprises one or more racks 10, each of which supports a plurality of discrete recorded media containers 12 having printed material on their covers. Such media includes compact discs, laser discs, audio cassettes, video cassettes and vinyl recordings. The racks are located in an enclosed case 16. In the embodiment illustrated, each rack comprises a series of slots 14. The size and spacing of the slots depends on the media which will be stored in the stand. In a compact disc rack each slot may be sized to carry two discs in order to accommodate the containers for two disc sets. The slots can either be vertical, FIGS. 1, 2, 4 and 5, or horizontal, FIGS. 3 and 5.

Also located in the case 16 is one or more openings 18 through which media containers are inserted into or removed from the racks. One opening is generally associated with each rack 10; however, as can be seen in FIG. 6, openings can be placed at both the front and back of a rack to permit the containers to be pushed all the way through the case. This permits the containers to be placed close together and yet be easily removed. In the embodiment illustrated in FIGS. 2, 4, and 5, the opening is covered by a door 20 which is openable to insert or remove the media containers. The door 20 is attached to the case 16 by a hinge 26 which rotates about either a vertical axis, FIGS. 2, 4 and 5, or a horizontal axis, FIG. 5. A window 21 extends through the door to permit the rack to be seen when the door is closed. The window is smaller than the containers so the containers cannot be removed from the rack without opening the door.

Figure 3:
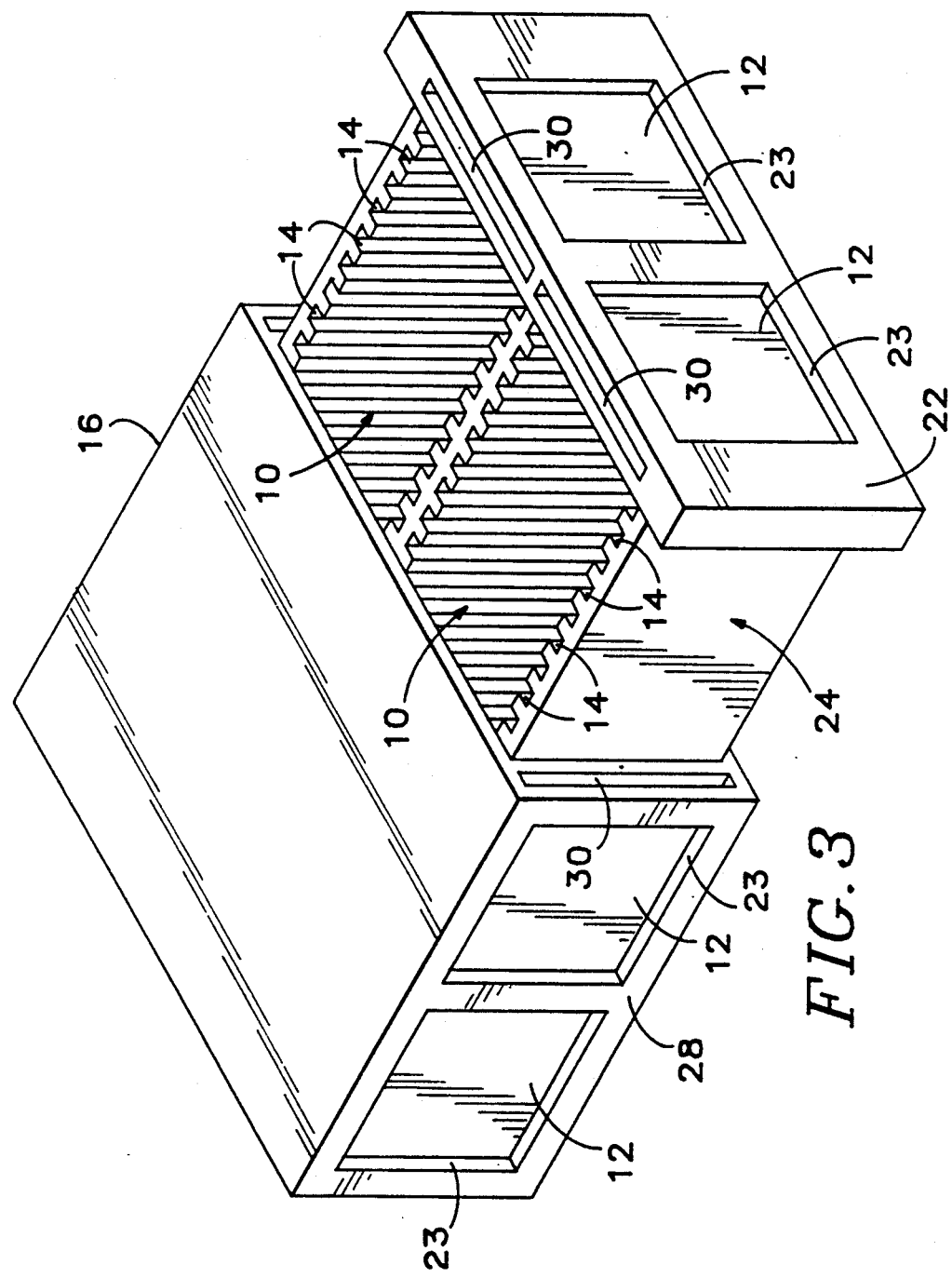
FIG. 3 is a perspective view of a storage and display rack showing another embodiment of the invention.
Figure 4:
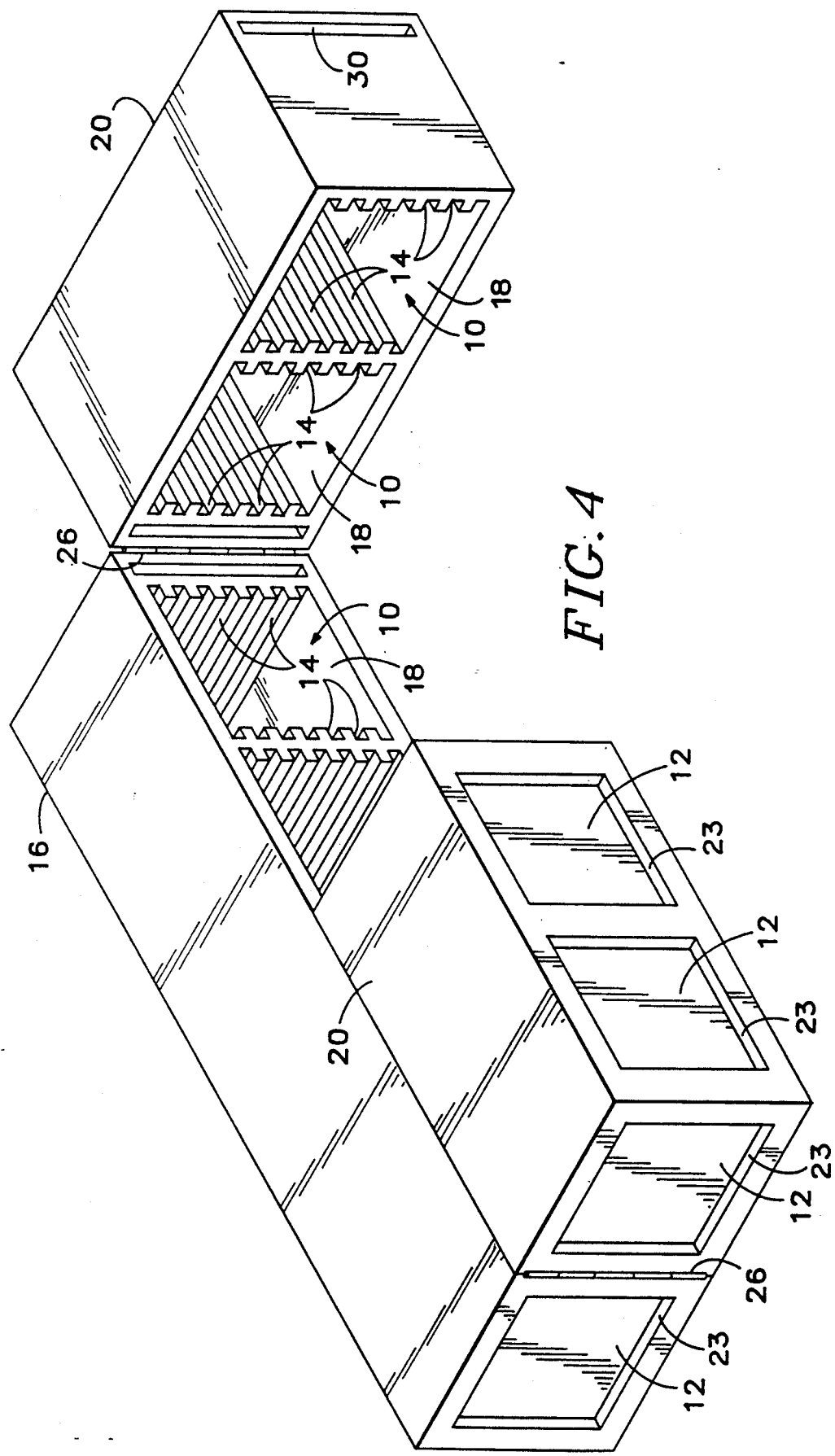
FIG. 4 is a perspective view of a storage and display rack showing another embodiment of the invention.
Figure 5:
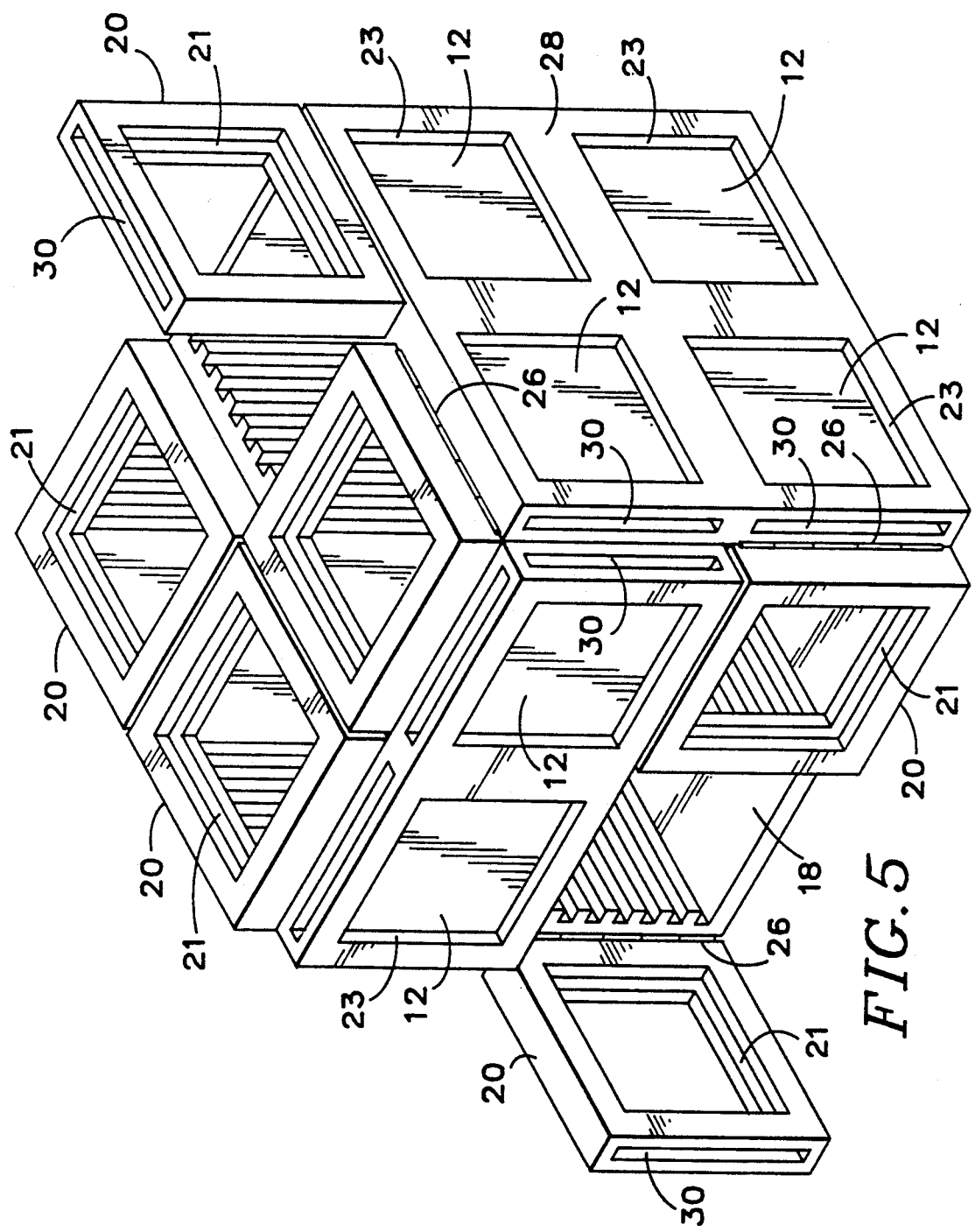
FIG. 5 is a perspective view of a storage and display rack showing another embodiment of the invention.
Figure 6:
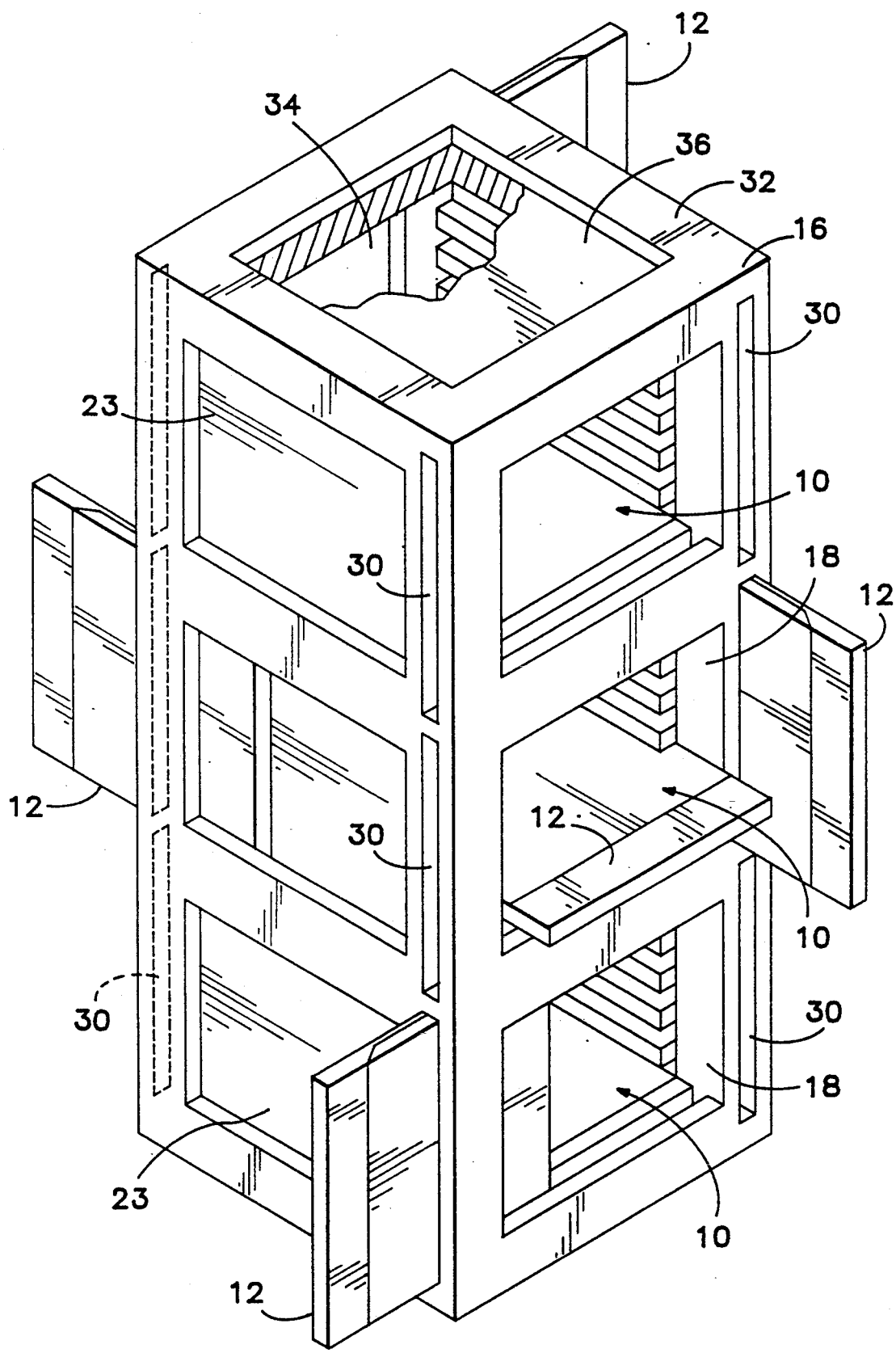
FIG. 6 is a perspective view of a storage and display rack showing another embodiment of the invention.

In addition to the window 21 in the door, windows 23 can be placed in the side walls 28 of the cases, FIGS. 3, 4, and 5. In the embodiment illustrated in FIG. 3, a window 23 is in the face 22 of a drawer 24 which contains the racks 10.

A slot 30 extends around the periphery of the case 16 or door 20, if there is one, to support the media container so that the printed material on its cover is visible through the opening of window. The slot 30 opens out of the case to allow the media container to be inserted and removed.

In the embodiment illustrated in FIG. 4, the racks 10 are arranged in pairs, with one rack in each pair being located in the door 20 and the other in the body of the case.

In the embodiment illustrated in FIG. 6, the top piece 32 of the case has an opening 34 formed in it which receives one of the media containers with its cover facing up. A shelf 36 located under the opening supports the container with its cover flush with the upper surface of the top piece 32.

In use, the displayed cover could be used to denote what material is located in the rack. It also could be used to indicate that the rack contains more copies of the same material, or that it contains other material from the same artist or composer. Alternatively, the container of the media being played can be displayed, or media containers can be randomly displayed.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A stand for storing and displaying sets of one or more thin rectangular recorded media containers or similar articles having a cover which displays printed material, said stand comprising:
   a. a case;
   b. first rack means, located in said case, for individually supporting a plurality of the sets of media containers horizontally at discrete horizontally separated levels such that removal of any one of the sets supported therein will not disturb any other set supported therein;
   c. said case having at least one opening defined therein which is the sole means through which the sets can be inserted into and removed from said first rack means;
   d. a door covering each said opening and being openable to permit insertion and removal of said media containers in said first rack means, said door defining a window and having support means for supporting one of the media containers in a manner such that said graphic material is visible through said window; and
   e. second rack means, located in said door, for individually supporting a plurality of the sets of media containers horizontally at discrete horizontally separated levels such that removal of any one of the sets supported therein will not disturb any other sets supported therein.

2. A stand for storing and displaying sets of one or more thin rectangular recorded media containers or similar articles having a cover which displays printed material, said stand comprising:
   a. a case;
   b. rack means, located in said case, for individually supporting a plurality of the sets of media containers horizontally at discrete horizontally separated levels such that removal of any one of the sets supported therein will not disturb any other sets supported therein;
   c. said case having at lease one opening defined therein which is the sole means though which the sets can be inserted into and removed from said rack means;
   d. support means circumscribing each said opening for supporting one of the media containers in a manner such that it covers said opening and its graphic material is visible; and
   e. said case including a top piece having a horizontal planar surface, said top piece including means to support one of the media containers coplanar with said horizontal planar surface with its graphic material being visible.

* * * * *

UNITED STATES PATENT AND TRADEMARK OFFICE
CERTIFICATE OF CORRECTION

PATENT NO. : 5,226,704
DATED : July 13, 1993
INVENTOR(S) : Mark A. Porter

It is certified that error appears in the above-indentified patent and that said Letters Patent is hereby corrected as shown below:

Col. 3, line 4: delete "of" insert --or--

Col. 4, line 32: after means delete "though" insert --through--

Signed and Sealed this

First Day of February, 1994

Attest:

BRUCE LEHMAN

Attesting Officer     Commissioner of Patents and Trademarks